United States Patent
De Mattia

(10) Patent No.: US 9,132,589 B2
(45) Date of Patent: Sep. 15, 2015

(54) METHOD FOR PRODUCING A CURVED PROFILE MADE FROM A COMPOSITE MATERIAL FROM A RECTILINEAR PREFORM OF FIBER WEBS

(71) Applicant: AIRBUS OPERATIONS (S.A.S), Toulouse (FR)

(72) Inventor: Denis De Mattia, Basse Goulaine (FR)

(73) Assignee: AIRBUS OPERATIONS SAS, Toulouse (FR)

(*) Notice: Subject to any disclaimer, the term of this patent is extended or adjusted under 35 U.S.C. 154(b) by 165 days.

(21) Appl. No.: 13/867,829

(22) Filed: Apr. 22, 2013

(65) Prior Publication Data

US 2013/0276964 A1    Oct. 24, 2013

(30) Foreign Application Priority Data

Apr. 23, 2012 (FR) ..................... 12 53674

(51) Int. Cl.
| | |
|---|---|
| B29C 53/02 | (2006.01) |
| B29C 70/02 | (2006.01) |
| B29C 70/46 | (2006.01) |
| B29D 99/00 | (2010.01) |
| B29C 53/08 | (2006.01) |
| B29L 31/00 | (2006.01) |

(52) U.S. Cl.
CPC ............. *B29C 70/021* (2013.01); *B29C 53/083* (2013.01); *B29C 70/46* (2013.01); *B29D 99/0003* (2013.01); *B29L 2031/001* (2013.01)

(58) Field of Classification Search
USPC ................. 264/258, 295, 339, 327, 319, 320; 156/212, 282, 223
See application file for complete search history.

(56) References Cited

U.S. PATENT DOCUMENTS

| | | | |
|---|---|---|---|
| 2009/0057948 A1* | 3/2009 | Krogager et al. | 264/258 |
| 2011/0104432 A1* | 5/2011 | Duqueine et al. | 428/113 |
| 2012/0097323 A1* | 4/2012 | Nitsch | 156/212 |
| 2012/0312459 A1 | 12/2012 | De Mattia | |

FOREIGN PATENT DOCUMENTS

| | | |
|---|---|---|
| DE | 43 35 062 | 4/1995 |
| EP | 1 031 406 | 8/2000 |
| FR | 2 928 295 | 9/2009 |
| FR | 2 952 577 | 5/2011 |

OTHER PUBLICATIONS

Holstein Wolfgang, Apr. 13, 1995, German Patent office.*
French Search Report dated Jan. 18, 2013.

* cited by examiner

*Primary Examiner* — Jacob T Minskey
*Assistant Examiner* — Vishal I Patel
(74) *Attorney, Agent, or Firm* — Dickinson Wright PLLC

(57) ABSTRACT

A method for producing a curved profile from a rectilinear preform of preimpregnated fiber webs, including stacking webs on the deformable mandrel and winding the deformable mandrel and the stacked webs on a bending tool along an axis of rotation (X), the profile including a stack of N webs, at least one first part of the profile being positioned in a plane perpendicular to the axis of rotation (X) and at least one second part parallel to the axis (X) whereof a face can be in contact with the bending tool. The method includes stacking the N fiber webs on the deformable mandrel, generating a heat gradient between the face and the rest of the preform that is hotter than the face, bending, in a single phase, the N webs inserted between the deformable mandrel and the bending tool, and polymerizing the N bent webs.

9 Claims, 3 Drawing Sheets

METHOD FOR PRODUCING A CURVED PROFILE MADE FROM A COMPOSITE MATERIAL FROM A RECTILINEAR PREFORM OF FIBER WEBS

CROSS REFERENCE TO RELATED APPLICATION

This application is entitled to and claims the benefit of French Application No. FR 12 53674 filed Apr. 23, 2012, the disclosure of which including the specification, claims, drawings and abstract is incorporated herein by reference in its entirety.

FIELD

The present invention relates to a method for producing a curved profile made from a composite material from a rectilinear preform of fiber webs. The invention more particularly relates to a method for producing a frame for a fuselage of an aircraft.

RELATED ART

According to one embodiment illustrated in FIG. 1, a fuselage frame 10 assumes the form of a profile with a Z-shaped cross-section, whereof the central portion, called the core 12, forms a complete or partial ring. The profile comprises a first wing 14 called the inner wing positioned at the inner edge of the core 12 perpendicular thereto, and a second wing 16 called the outer wing positioned at the outer edge of the core 12, also perpendicular thereto.

One method for producing such a frame made from a composite material is described in document FR-2.928.295.

According to this document, a substantially rectilinear strip is first made from a stack of three preimpregnated fiber webs, each one having fibers oriented in a direction, the strip including webs with different fiber orientations, i.e., a web with fibers at 30°, a web with fibers at 90°, and another web with fibers at 150°.

Secondly, the fiber strip is positioned on a mandrel made from a deformable material, then compressed on that mandrel so as to fit the shape thereof.

The deformable mandrel is capable of deforming between a rectilinear position and a curved position, but has an incompressible or quasi-incompressible transverse cross-section.

Subsequently, the deformed strip positioned on the mandrel made from a deformable material is put in contact with a heated tool having, on its periphery, radial sections with a profile complementary to the transverse cross-sections of the mandrel. Thus, during bending, the strip is compressed and undergoes a temperature increase.

Following the placement of said first strip, a second strip of three preimpregnated fiber webs is cut out to be positioned on another deformable mandrel, then compressed thereon.

Subsequently, the second deformed strip on its mandrel made from a deformable material is put in contact against the first strip, still positioned on the tool, then compressed against the first strip.

To obtain a frame, it is necessary, as above, to attach several strips on one another, before polymerizing the assembly thus formed.

Additionally, webs with fibers oriented at 0° can be added manually between certain strips.

This operating method is not fully satisfactory for the following reasons:

First, the implementation is relatively long and tedious because the profile is done step-by-step, a large number of strips having to be deformed and bent consecutively.

Secondly, the relative positioning between the strips is difficult to do, since the strips are made up preimpregnated fibers and may find it difficult to slide relative to one another to correct their relative positions. Additionally, it is difficult to guarantee that during bending, the two inner wings of the two strips, the two cores of the two strips, and the two outer wings of the two strips are in perfect contact with each other over the entire length of the frame. In light of these placement difficulties, operators must intervene many times to try to correct observed defects manually.

According to another issue, as the strips are stacked, the outer radii increase in value, while the inner radii decrease, with the result that the value deviation between the strip already placed on the bending tool and the attached strip leads to a defect called bridging, the two strips not being closely pressed against one another at the bottom of the curve radius. This defect will, during polymerization, cause crimping that is detrimental to the quality of the part.

According to another issue, it is impossible to bend the strips after they have been compacted without causing sliding between the preimpregnated fiber webs, and thereby causing crimping or folding of the fibers.

According to another issue, the webs of the first strip remain in contact with the tool heated to a temperature of approximately 50° C. much longer than the webs of the last attached strip, which causes accelerated and uncontrolled aging of the resin impregnating the first webs.

According to another drawback, this operating mode leads to low productivity, due to the fact that many bending phases must be carried out consecutively.

And lastly, according to another issue, the fibers oriented at 0° must be placed manually on the bent forms so as to reduce the risk of crimping. This manual placement tends to increase the production time and cost.

SUMMARY

Consequently, the present invention aims to resolve the drawbacks of the prior art by proposing a method for producing a curved profile made from composite material from a rectilinear preform of fiber webs making it possible to reduce the risks of crimping of the fibers oriented at 0°, in particular at the inner wing.

To that end, the invention relates to a method for producing a curved profile from a rectilinear preform of preimpregnated fiber webs, said method consisting of stacking webs on the deformable mandrel and winding said deformable mandrel and the stacked webs on a bending tool along an axis of rotation, said profile comprising a stack of N webs, at least one first part of the profile being positioned in a plane perpendicular to the axis of rotation and at least one second part parallel to the axis whereof a face can be in contact with the bending tool, characterized in that it consists of stacking the N fiber webs on the deformable mandrel, generating a heat gradient between the face of the second part of the preform and the rest of the preform that is hotter than said face, bending, in a single phase, the N webs inserted between the deformable mandrel and the bending tool, and polymerizing said N bent webs.

BRIEF DESCRIPTION OF DRAWINGS

Other features and advantages will emerge from the following description of the invention, which is provided solely as an example, in light of the appended drawings, in which.

DETAILED DESCRIPTION OF EMBODIMENTS

Figure 1:
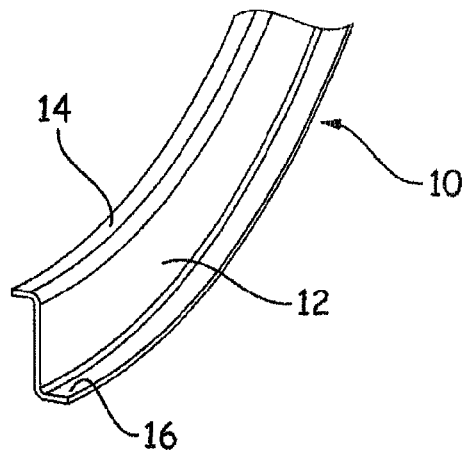
FIG. 1 is a perspective view of a portion of a frame of a fuselage of an aircraft.

In FIG. 1, a fuselage frame 10 is shown in the form of a profile with a Z-shaped cross-section, whereof the central portion, called the core 12, forms a complete or partial ring. The profile comprises a first wing 14, call the inner wing, positioned at the inner edge of the core 12 and perpendicular thereto, and a second wing 16, called the outer wing, positioned at the outer edge of the core 12, also perpendicular thereto.

To provide an order of magnitude, the core has a height of 80 mm and a thickness of approximately 4 to 6 millimeters. The wings have a width of approximately 30 mm.

The invention is not limited to this cross-section shape and this application. Thus, the invention may make it possible to obtain different curved profiles with a J-, Z-, L-, omega- or otherwise shaped cross-section.

According to the invention, the profile 10 is curved along an axis of rotation X and a curve radius R. Thus, the curved profile 10 comprises at least one first part, more particularly the core 12, in a plane perpendicular to the axis of rotation X and at least one second part, more particularly the wing 14, parallel to the axis X. The different parts of the profile are connected to each other by curved portions. Thus, a first surface of the first part is continuous with the first surface of each other part. These first surfaces form a surface referred to hereafter as the outer surface. Likewise, a second surface of the first part is continuous with a second surface of each other part. The second surfaces form a surface hereafter referred to as the inner surface, whereof a portion is oriented toward the axis of rotation X.

According to the invention, the curved profile 10 comprises a stack of N webs, N being an integer greater than or equal to 10 webs. To provide an order of magnitude, the profile comprises approximately 50 webs.

The webs comprise preimpregnated fibers for each web in one direction.

This curved profile is obtained from a rectilinear preform 20 having transverse cross-sections identical to those of the curved profile 10 to be obtained.

A longitudinal direction refers to the largest dimension of the rectilinear preform. A transverse plane is a plane perpendicular to the longitudinal direction.

The rectilinear preform 20 is obtained by the stack of N webs necessary to form the curved profile on a deformable mandrel 22.

Deformable means that the mandrel can be deformed between a rectilinear position and a curved position, but has an incompressible or quasi-incompressible transverse section.

According to one embodiment, the mandrel is made from an elastomer.

The deformable mandrel 22 comprises a cross-section complementary to that of the curved profile.

The N webs of the curved profile are stacked on one another, the first web placed on the mandrel forming the outer surface of the profile and the last web placed forming the inner surface of the profile.

Figure 2:
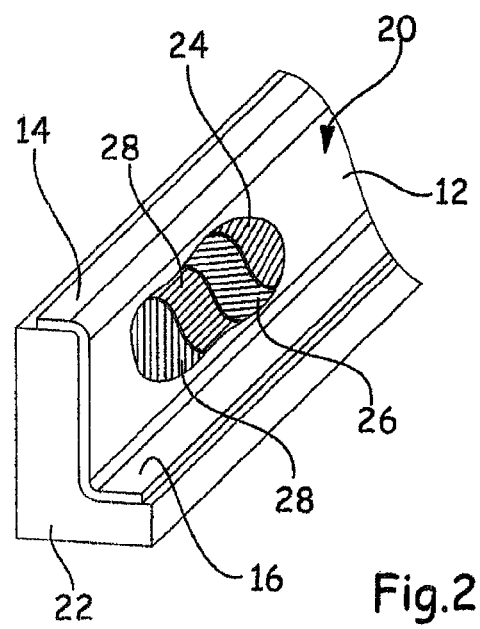
FIG. 2 is a perspective view of the stack of webs on a rectilinear deformable mandrel with a cutaway making it possible to illustrate the orientation of the fibers of the stacked webs.
Figure 3:
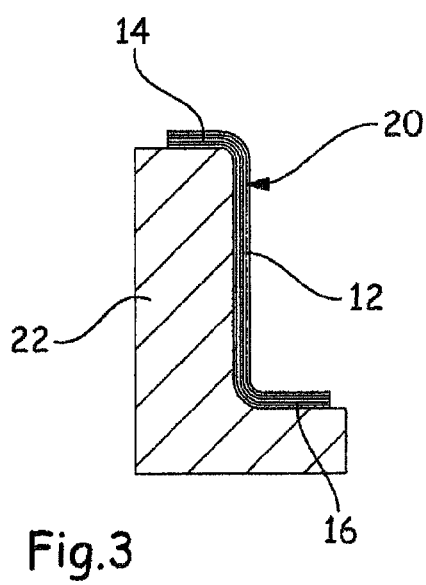
FIG. 3 is a transverse cross-section of the stack of fiber webs and the mandrel of FIG. 2.

As illustrated in FIG. 2, certain webs 24 can have fibers oriented at A° relative to the longitudinal direction and other webs 26 may have fibers oriented that −A° relative to the longitudinal direction, A being able to vary from 10 to 90°.

The values A are determined as a function of the desired mechanical characteristics. These values A are determined by the engineering firm and must respect an allowance interval of +/−3°. Thus, when the nominal value A of the orientation is 30°, the fibers must form an angle with the longitudinal direction comprised between 27° and 33°.

As an example, certain webs may have fibers oriented at 30° and other webs may have fibers oriented at −30°. Some webs may have fibers oriented at 60° and other webs fibers oriented at −60°. Some webs 28, 28' may have fibers respectively oriented at 0° and 90°.

Preferably, for each value of A, the curved profile comprises as many webs with fibers oriented at A° as there are webs with fibers oriented at −A°. When the curved profile 10 comprises a stack of 10 to 20 webs, it may comprise M' webs with fibers oriented at A° and M'+/−1 webs with fibers oriented at −A°. Beyond 20 webs, the profile may comprise M webs with fibers oriented at A° and M+/− 5% webs with fibers oriented at −A°.

Advantageously, a web with fibers oriented at A° is adjacent to a web with fibers oriented at −A°.

Figure 4:
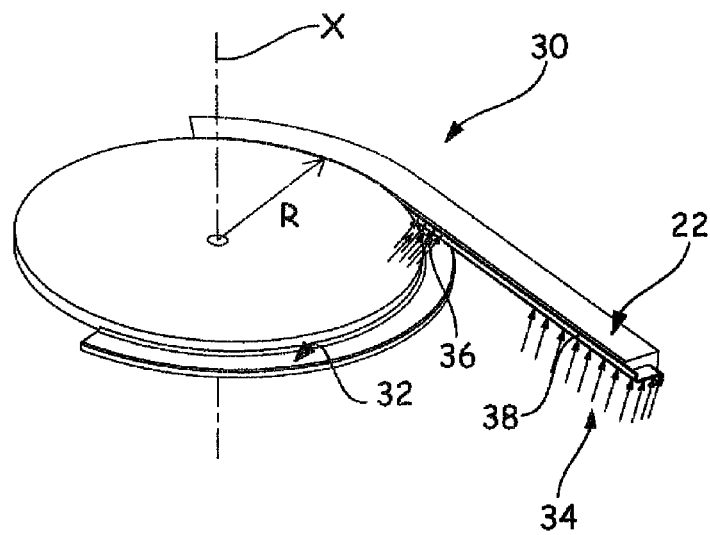
FIG. 4 is a diagrammatic illustration of the bending device used to bend the stack of webs and the mandrel of FIG. 2.

When all of the webs of the curved profile 10 are attached on the deformable mandrel 22, a bending phase is done using a bending device 30. During the bending phase, the mandrel and all of the webs are wound on a bending tool 32 of the bending device 30, as illustrated in FIG. 4, the bending tool 32 having cross-sections complementary to the cross-sections of the inner surface of the curved profile.

According to one important aspect of the invention, the bending device 30 comprises means 34 for heating the rectilinear preform 20 and means 36 for cooling the face 38 of the wing 14 that may be in contact with the bending tool 32, the cooling means 36 being inserted between the heating means 34 and the bending area (area where the preform comes into contact with the bending tool).

This preheating and this cooling are done continuously.

Preferably, the heating means 34 make it possible to increase the temperature of the preform to a temperature of approximately 70° C. in the entire cross-section of the preform. According to one embodiment, the preform is heated with pulsed hot air, over a portion situated approximately 500 mm upstream from the deformation area.

Preferably, the cooling means 36 make it possible to cool the face 38 of the inner wing to a temperature of approximately 15 to 20° C. According to one embodiment, the face 38 is cooled with pulsed cool air, over a portion situated approximately 100 mm upstream from the deformation area.

Thus, each cross-section of the preform is first heated in its entirety, then undergoes localized cooling at the face 38 of the inner wing that may be in contact with the tool just before the insertion thereof in the bending tool.

Figure 7:
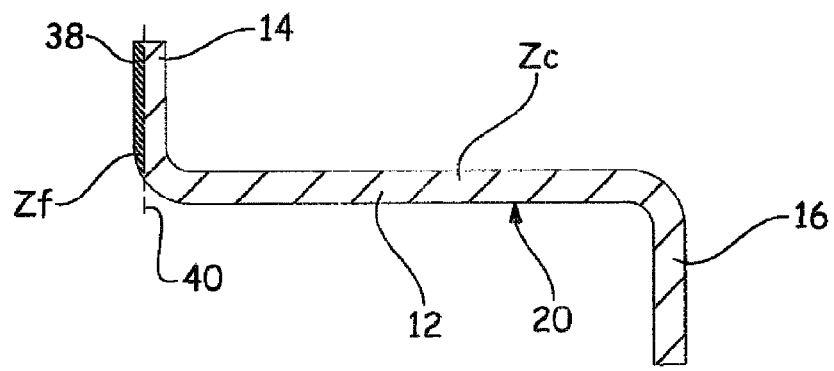
FIG. 7 is a cross-section of the stack of webs.

As illustrated in FIG. 7, owing to this driving of the temperature, a heat distribution is obtained in the cross-section with two areas, the area a corresponding to the hot area, and the area Zf corresponding to the cold area, the two areas being separated by a strong heat gradient embodied by a straight line, substantially parallel to the face 38 of the cooled inner wing, corresponding to a thermal neutral fiber 40.

This method of heating the preform makes it possible to obtain a thermal neutral fiber 40 as close as possible to the face 38 of the inner wing in contact with the bending tool 32. All of the fibers situated outside the neutral fiber 40 will be subjected to tractive forces and will not crimp. The neutral fiber 40 being very close to the outer surface of the inner wing, the fibers oriented at 0° situated at that level will not be subjected to a compression force and will not tend to crimp.

According to another feature of the invention, the method consists of creating strong adhesion between the face 38 of the inner wing and the bending tool 32. To generate this strong adhesion, the bending tool 32 comprises heating means 42 (shown in FIG. 8) to bring at least its surface that may be in contact with the face 38 to a temperature of approximately 30° C., while the face 38 has a temperature from 15° C. to 20° C. Thus, the surface of the tool and the face 38 have different temperatures, the tool having a temperature approximately 5° higher than that of the face 38 of the preform. This solution makes it possible to limit the sliding of the fibers positioned at the face 38, and therefore the appearance of crimping of said fibers. Advantageously, the method consists of creating a weak adhesion between the surfaces of the preform and the mandrel 22. According to one embodiment illustrated in FIG. 8, two films 44 are superimposed between the preform and the mandrel, said films having a low adhesion relative to one another. The films 44 may be separating films, for example made from fluoroethylene propylene.

Figure 8:
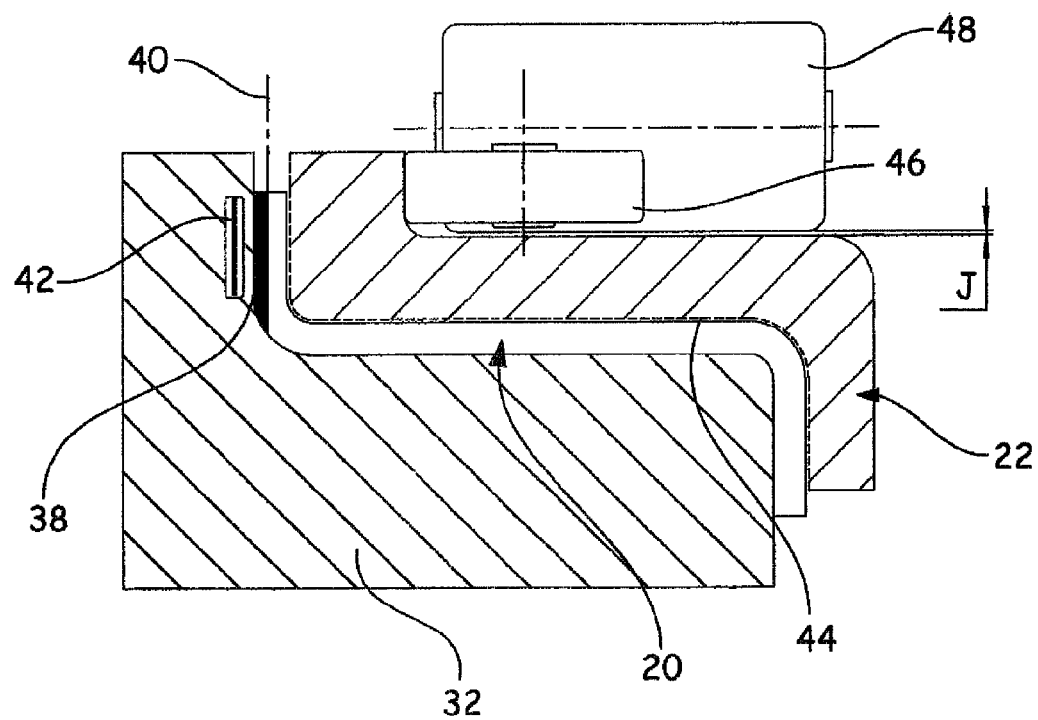
FIG. 8 is a cross-section of a bending tool according to one preferred embodiment.

As illustrated in FIG. 8, the bending device comprises rollers making it possible to press the mandrel 22 against the bending tool, a first roller 46 capable of pressing the part of the mandrel 22 that presses the inner wing of the preform against the bending tool and a second roller 48 whereof the generatrix is parallel to the core. Preferably, slight play J is preserved between the roller 48 and the mandrel so as to favor the sliding between the mandrel and the preform.

The bending operation of all of the webs during a single and same bending operation is possible in particular due to an identical or quasi-identical number of webs with fibers oriented at A° and webs with fibers oriented at −A°.

Figure 5:
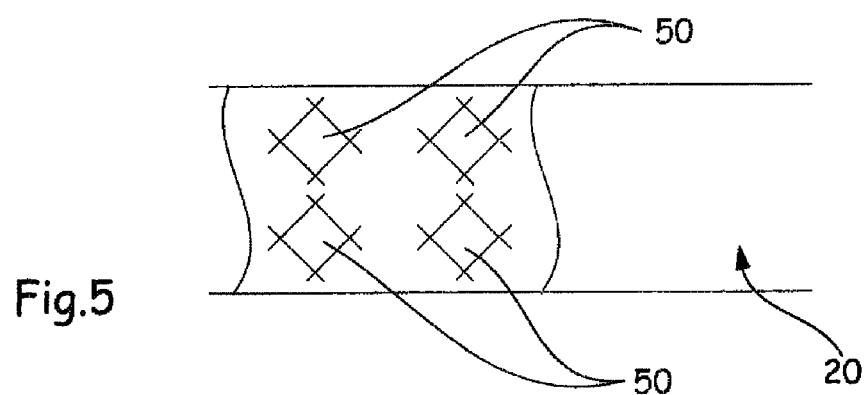
FIG. 5 is an illustration of the orientation of certain fibers before bending.

The fibers oriented at A° form, with the fibers oriented −A°, elementary diamonds 50 that are all identical when the preform is rectilinear, as illustrated in FIG. 5. After deformation, the elementary diamonds are still symmetrical relative to a radial direction 52. During the deformation, the points of intersection of the fibers A° and −A° act as nodes where the fibers pivot. Thus, the webs with fibers oriented at A° and those with fibers oriented at −A° deform without wrinkling.

Figure 6:
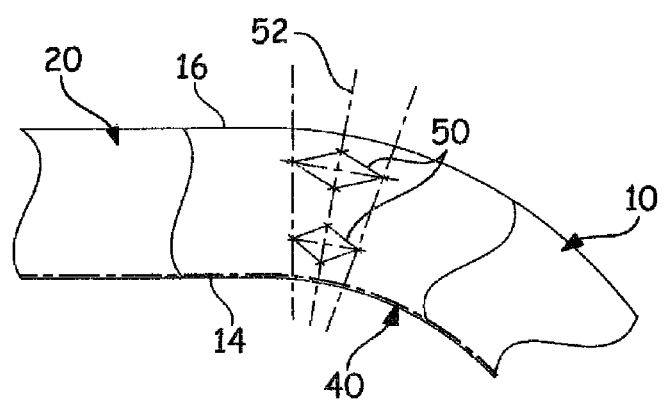
FIG. 6 is an illustration of the orientation of the same fibers as FIG. 5 after the bending operation.

According to one preferred embodiment illustrated in FIG. 6, all of the elementary diamonds deform symmetrically relative to radial directions 52. The neutral fiber 40 being positioned at the inner wing 14, all of the elementary diamonds 50 stretch in a direction perpendicular to the radial direction. In that case, all of the fibers are subjected to a tractive force and no wrinkling is possible.

As illustrated in FIG. 6, the orientation of the fibers oriented at A° and −A° in the rectilinear preform is modified after the bending.

Thus, the angle formed by the fibers initially oriented at A° decreases as a function of the distance from the axis of rotation X, whereas that formed by the fibers initially oriented at −A° increases as a function of the distance from the axis of rotation X.

In light of the allowance interval +/−IT of approximately +/−3° set by the engineering firm, the fibers intended to be oriented at A° will be positioned at A+IT° before the bending and the fibers intended to be oriented at −A° will be positioned at −(A+IT)° before the bending. According to this arrangement after the bending phase, all of the fibers are oriented correctly and form an angle of +A+/−IT or −A+/−IT. This arrangement makes it possible to increase the height of the core significantly. As an example, the height of the core was limited to approximately 80 mm in the prior art, while it can reach approximately 170 mm with the invention.

When A=30° and the allowance interval is +/−3°, before deformation, the fibers of certain webs are oriented at +33° while the fibers of other webs are oriented at −33°. In that case, after bending, all of the fibers are correctly oriented and respect the allowance interval. Thus, for certain webs, the fibers close to the inner wing 14 are oriented at 33° and the fibers close to the outer wing 16 are oriented at 27° and all respect the orientation of 30°+/−3°.

After the bending phase, the bent webs are polymerized. According to one embodiment, it is possible to remove the deformable mandrel and apply a bladder above the bent preform to exert pressure on the webs during the temperature cycle. Alternatively, the bladder may be attached above the mandrel during the polymerization phase, the mandrel performing the pressing function to configure the outer surface of the curved profile.

The inventive method procures the following advantages:

First, the method makes it possible to reduce the production costs and time greatly, inasmuch as all of the webs are bent in a single phase, and not using a step-by-step method.

Secondly, the inventive method makes it possible to limits scraps, due to the absence of wrinkling or bridging at the curve radii.

According to another advantage, it is possible to produce profiles with larger cores.

According to another advantage, the fact that the neutral fiber is positioned at the face 38 of the inner wing in contact with the bending tool makes it possible not to cause compression forces at the fibers oriented at 0° in the inner wing, which consequently do not crimp.

According to another advantage, the inventive method makes it possible to control the position of the reinforcing fibers at the core inasmuch as the neutral fiber is perfectly positioned at the face 38.

According to one advantage of the invention, the bending speed is much higher than that of the prior art, approximately 8 mm/s, as the preform is preheated upstream from the bending tool.

Lastly, the method ensures better control of the aging of the resin inasmuch as only the deformed portion undergoes a temperature increase.

The invention claimed is:

1. A method for producing a curved profile from a rectilinear preform of preimpregnated fiber webs, said method comprising:
   stacking N fiber webs on a deformable mandrel to obtain a preform having a cross-section including at least one first part and at least one second part oriented perpendicular relative to each other, and
   winding said deformable mandrel and the stacked N fiber webs that form said preform on a bending tool along an axis of rotation (X) to bend said preform to have said curved profile, said at least one first part being positioned in a plane perpendicular to the axis of rotation (X) and said at least one second part being positioned parallel to the axis (X) whereof a face portion of said at least one second part is enabled to be in contact with the bending tool, said winding including:

pre-heating each section of the preform in its entirety prior to a leading portion of the preform being introduced with said deformable mandrel onto the bending tool, while said pre-heating is being performed, generating, just prior to the leading portion of the preform and the deformable mandrel being introduced onto the bending tool, a heat gradient between said leading portion of the preform and the rest of the preform such that the rest of the preform is hotter than said leading portion of the preform, bending, in a single operation, the N fiber webs while they are disposed between the deformable mandrel and the bending tool to provide said curved profile of said N bent fiber webs, and polymerizing said curved profile of said N bent fiber webs.

2. The method according to claim 1, characterized in that each section of the preform is brought to a temperature of 70° C. prior to being introduced with said deformable mandrel onto the bending tool.

3. The method according to claim 2, characterized in that the leading portion of the face portion is cooled to a temperature between 15 and 20° C. just prior to the preform and the deformable mandrel being introduced onto the bending tool.

4. The method according to claim 1, further comprising creating a strong adhesion between the face portion of the rectilinear preform and the bending tool.

5. The method according to claim 4, further comprising generating a temperature difference between the surface of the bending tool in contact with the face portion of the preform and said face portion.

6. The method according to claim 5, characterized in that the surface of the bending tool in contact with the face portion of the preform has a temperature 5° C. higher than that of the face portion of the preform.

7. The method according to claim 1, further comprising creating a low adhesion between surfaces of the preform and the deformable mandrel.

8. The method according to claim 7, further comprising inserting, between the surfaces of the preform and the deformable mandrel, two superimposed films having a low adhesion relative to one another.

9. The method according to claim 1, further comprising using rollers making it possible to press the deformable mandrel against the bending tool, a first roller being configured to press the part of the deformable mandrel that presses the at least one second part of the preform against the bending tool and a second roller whereof the generatrix is parallel to the core of the preform and spaced away from the deformable mandrel by slight play (J) so as to favor sliding between the deformable mandrel and the preform.

* * * * *